US011082713B2

United States Patent
Liu et al.

(10) Patent No.: US 11,082,713 B2
(45) Date of Patent: Aug. 3, 2021

(54) METHOD AND APPARATUS FOR GLOBAL MOTION COMPENSATION IN VIDEO CODING SYSTEM

(71) Applicant: MEDIATEK INC., Hsin-Chu (TW)

(72) Inventors: Shan Liu, San Jose, CA (US); Xiaozhong Xu, State College, PA (US)

(73) Assignee: MEDIATEK INC., Hsin-Chu (TW)

( * ) Notice: Subject to any disclaimer, the term of this patent is extended or adjusted under 35 U.S.C. 154(b) by 66 days.

(21) Appl. No.: 15/776,170

(22) PCT Filed: Nov. 18, 2016

(86) PCT No.: PCT/US2016/062681
§ 371 (c)(1),
(2) Date: May 15, 2018

(87) PCT Pub. No.: WO2017/087751
PCT Pub. Date: May 26, 2017

(65) Prior Publication Data
US 2020/0260111 A1    Aug. 13, 2020

Related U.S. Application Data

(60) Provisional application No. 62/257,754, filed on Nov. 20, 2015.

(51) Int. Cl.
*H04N 19/527* (2014.01)
*H04N 19/70* (2014.01)

(52) U.S. Cl.
CPC .......... *H04N 19/527* (2014.11); *H04N 19/70* (2014.11)

(58) Field of Classification Search
None
See application file for complete search history.

(56) References Cited

U.S. PATENT DOCUMENTS 5,473,379 A    12/1995 Horne
9,241,160 B2    1/2016 He et al.
(Continued)

FOREIGN PATENT DOCUMENTS

CN    1156944 A    8/1997
CN    1633812 A    6/2005
(Continued)

OTHER PUBLICATIONS

International Search Report dated Mar. 16, 2017, issued in application No. PCT/US2016/062681.
(Continued)

*Primary Examiner* — Lindsay J Uhl
(74) *Attorney, Agent, or Firm* — McClure, Qualey & Rodack, LLP

(57) ABSTRACT

A method and apparatus of Inter prediction for video coding performed in a video encoder or a video decoder are disclosed. In one method, a GMC (global motion compensation) indication indicating whether global motion compensation is enabled is signalled at the video encoder side or parsed from the video bitstream at the video decoder side. The current processing unit is encoded or decoded using one or more coding modes including a GMC mode if the GMC indication is indicates GMC is enabled. According to another method, if a GMC mode is enabled for a region, a number representing the total number of multiple global motion models allowed is determined for encoding or decoding the processing units in the region using multiple global motion models. In yet another method the GMC and local motion compensation are applied selectively or in a combined fashion.

20 Claims, 5 Drawing Sheets

(56) References Cited

U.S. PATENT DOCUMENTS

| | | | |
|---|---|---|---|
| 10,554,983 B2 | 2/2020 | Kim et al. | |
| 2003/0043912 A1 | 3/2003 | Sun et al. | |
| 2003/0123738 A1* | 7/2003 | Frojdh | H04N 19/46 |
| | | | 382/236 |
| 2003/0174775 A1 | 9/2003 | Nagaya et al. | |
| 2003/0174776 A1 | 9/2003 | Shimizu et al. | |
| 2003/0202594 A1 | 10/2003 | Lainema | |
| 2005/0105621 A1 | 12/2005 | Ju | |
| 2008/0159393 A1 | 7/2008 | Lee et al. | |
| 2010/0328425 A1 | 12/2010 | Nagaraj et al. | |
| 2013/0121416 A1* | 5/2013 | He | H04N 19/597 |
| | | | 375/240.14 |
| 2014/0334547 A1 | 11/2014 | Knee et al. | |

FOREIGN PATENT DOCUMENTS

| | | |
|---|---|---|
| CN | 103026707 A | 4/2013 |
| CN | 104521232 A | 4/2015 |

OTHER PUBLICATIONS

Chinese language office action dated Dec. 9, 2020, issued in application No. CN 201680067484.9.

* cited by examiner

METHOD AND APPARATUS FOR GLOBAL MOTION COMPENSATION IN VIDEO CODING SYSTEM

CROSS REFERENCE TO RELATED APPLICATIONS

The present invention claims priority to U.S. Provisional Patent Application, Ser. No. 62/257,754, filed on Nov. 20, 2015. The U.S. Provisional Patent Application is hereby incorporated by reference in its entirety.

FIELD OF THE INVENTION

The present invention relates to video coding using motion estimation and motion compensation. In particular, the present invention relates to global motion compensation for video compression.

BACKGROUND AND RELATED ART

Various video coding standards have been developed over the past two decades. In newer coding standards, more powerful coding tools are used to improve the coding efficiency. High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In most coding standards, adaptive Inter/Intra prediction is used on a block basis. In the Inter prediction mode, one or two motion vectors are determined for each block to select one reference block (i.e., uni-prediction) or two reference blocks (i.e., bi-prediction). The motion vector or motion vectors are determined and coded for each individual block. For certain pictures, such as those captured under camera pan, the whole picture or parts of the picture undergo a same motion (i.e., translational global motion). Accordingly, global motion compensation (GMC) has been used in some coding standards. In the following, some known GMC techniques are briefly discussed.

In order to describe the global motion, various global motion models have been widely used in the field to describe the motion across pictures along temporal axis. Assuming A (x, y) be the original pixel at location (x, y) under consideration, A' (x', y') be the corresponding pixel at location (x', y') in a reference picture for a current pixel A(x, y), some typical motion models are described as follows.

Translational Model

The simplest one is the 2-D translational motion, where all the pixels in the area of interest follow the same motion direction and magnitude. This model can be described as follows, where a0 is the movement in the horizontal direction and b0 is the movement in the vertical direction:

$$x'=a0+x, \text{ and}$$

$$y'=b0+y. \quad (1)$$

In this model, two parameters (i.e., a0 and b0) are to be determined. Equation (1) is true for all pixels (x, y) in the area of interest. Therefore, the motion vector for pixel A(x, y) and corresponding pixel A'(x', y') in this area is (a0, b0). FIG. 1 illustrates an example of global motion compensation according to the translational model, where a current area 110 is mapped to a reference area 120 in a reference picture. The correspondences between the four corner pixels of the current area and the four corner pixels of the reference area are indicated by the four arrows.

Scaling Model

The scaling model includes the scaling effect in addition to the translational movement in the horizontal and vertical direction. The model can be described as follows:

$$x'=a0+a1*x, \text{ and}$$

$$y'=b0+b1*y. \quad (2)$$

According to this model, a total of four parameters are used, which include scaling factors a1 and b1 and translational movement values a0 and b0. For each pixel A(x, y) in the area of interest, the motion vector for this pixel and its corresponding reference pixel A'(x', y') is (a0+(a1−1)*x, b0+(b1−1)*y). Therefore, the motion vector for each pixel is location dependent. FIG. 2 illustrates an example of global motion compensation according to the scaling model, where a current area 210 is mapped to a reference area 220 in a reference picture. The correspondences between the four corner pixels of the current area and the four corner pixels of the reference area are indicated by the four arrows.

Affine Model

The affine model is capable of describing two-dimensional block rotations as well as two-dimensional deformations to transform a square (or rectangles) into a parallelogram. This model can be described as follows:

$$x'=a0+a1*x+a2*y, \text{ and}$$

$$y'=b0+b1*x+b2*y. \quad (3)$$

In this model, a total of six parameters are used. For each pixels A(x, y) in the area of interest, the motion vector between this pixel and its corresponding reference pixel A'(x', y') is (a0+(a1−1)*x+a2*y, b0+b1*x+(b2−1)*y). Therefore, the motion vector for each pixel is also location dependent. FIG. 3 illustrates an example of global motion compensation according to the affine model, where a current area 310 is mapped to a reference area 320 in a reference picture. The affine transform can map any triangle to any triangle. In other words, the correspondences between the three corner pixels of the current area and the three corner pixels of the reference area can be determined by the three arrows as shown in FIG. 3. In this case, the motion vector for the fourth corner pixel can be derived in terms of the other three motion vectors instead of derived independently of the other three motion vectors. The six parameters for the affine model can be derived based on three known motion vectors for three different locations. Parameter derivation for the affine model is known in the field and the details are omitted here.

Perspective Model

The perspective motion model can be used to describe camera motions such as zoom, pan and tilt. This model can be described as follows:

$$x'=(a0+a1*x+a2*y)/(1+c1*x+c2*y), \text{ and}$$

$$y'=(b0+b1*x+b2*y)/(1+c1*x+c2*y) \quad (4)$$

In this model, eight parameters are used. For each pixels A(x, y) in the area of interest, the motion vector for this case can be determined from the corresponding A'(x', y') and A(x, y), i.e., (x'−x, y'−y). Therefore, the motion vector for each pixel is location dependent.

In general, an N-parameter model can be solved by having M pixel pairs A and A' as input. In practice, M pixel pairs can be used, where M>N. For example, in the affine model, parameter set a=(a0, a1, a2) and b=(b0, b1, b2) can be solved independently.

Let $C=(1, 1, \ldots, 1)$, $X=(x_0, x_1, \ldots, x_{M-1})$, $Y=(y_0, y_1, \ldots, y_{M-1})$, $U=(x'_0, x'_1, \ldots, x'_{M-1})$ and $V=(y'_0, y'_1, \ldots, y'_{M-1})$, then the following equations can be derived:

$$Ka^T = U, \text{ and}$$

$$Kb^T = V. \quad (4)$$

Therefore, parameter set a can be solved according to $a=(K^TK)^{-1}(K^TU)$ and set b can be solved according to $b=(K^TK)^{-1}(K^TV)$, where $K=(C^T, X^T, Y^T)$, $K^TK$ is always a 3×3 matrix regardless of the size of M.

In a technical paper by Li (L. Li, H. Li, Z. Lv and H. Yang, "An Affine Motion Compensation Framework for High Efficiency Video Coding", 2015 IEEE International *Symposium on Circuits and Systems* (*ISCAS*), May 2015, Pages: 525-528), the three motion vectors at the corners of a CU are derived and signalled, which are used to derive the motion vectors for the pixels inside the CU using the affine motion model (i.e., the six-parameter model).

It is desirable to improve the efficiency of using global motion compensation in a video encoding or decoding system.

BRIEF SUMMARY OF THE INVENTION

A method and apparatus of Inter prediction for video coding performed in a video encoder or a video decoder are disclosed. According to this method, a GMC (global motion compensation) indication is signalled at the video encoder side or parsed from the video bitstream at the video decoder side. The GMC indication indicates whether global motion compensation is enabled. The current processing unit is encoded at the video encoder side or decoded at the video decoder side using one or more coding modes including a GMC mode if the GMC indication indicates global motion compensation is enabled. The current processing unit may correspond to a sequence, a picture, a slice, a tile, a region, a coding block or a prediction block. The GMC indication can be signalled in the video bitstream at a syntax level higher than or equal to a level of the current processing unit. Furthermore, a GMC use flag can be signalled for the current processing unit in the video bitstream at the video encoder side or parsed for the current processing unit from the video bitstream at the video decoder side. The GMC use flag indicates whether the GMC mode is applied to the current processing unit. The total number of parameters and values of parameters associated with a global motion model can be signalled for the GMC mode if the GMC indication indicates global motion compensation is enabled. In some embodiments, a flag indicating a number of global motion models used for the GMC mode can be signalled in the video bitstream at the video encoder side or parsed from the video bitstream at the video decoder side if the GMC indication indicates global motion compensation is enabled. In some embodiments, a flag indicating a selected global motion model selected from candidate global motion models can be signalled in the video bitstream at the video encoder side or parsed from the video bitstream at the video decoder side for the current processing unit.

According to another method, if a GMC mode is enabled for a region, a first number representing the total number of multiple global motion models allowed is determined for encoding or decoding the processing units in the region using multiple global motion models. The current processing unit is encoded or decoded using one or more coding modes including the GMC mode with one global motion model selected from the multiple global motion models. A second number representing the total number of parameters for each of the multiple global motion models can be included in the video bitstream. A motion type for each of the multiple global motion models can be included in the video bitstream at a high level syntax associated with the region, where the motion type is mapped to a corresponding total number of parameters for each of the multiple global motion models. The motion type can be binarized using variable length codes. The motion type for a given global motion model can also be coded predictively by another motion type for the given global motion model associated with a previous coded region. In this case, the previous coded region may correspond to a left region, a top region or a temporally collocated region. Furthermore, a flag can be used to indicate whether the motion type for the given global motion model is exactly predicted by another motion type for the given global motion model associated with the previous coded region.

In the above method, parameters for each of the multiple global motion models are incorporated in the video bitstream at a high level syntax associated with the region. The high level syntax may correspond to SPS (sequence parameter set), PPS (picture parameter set), a slice header or a block. The current processing unit may correspond to a CTU (coding tree unit), a coding block or a prediction block. The parameters for a given global motion model can be signalled predictively in the high level syntax using other parameters for the given global motion model associated with a previous coded region. The previous coded region may correspond to a left region, a top region or a temporally collocated region. A flag can be used to indicate whether the parameters for the given global motion model are exactly predicted by the other parameters for the given global motion model associated with the previous coded region.

In some embodiment, a GMC indication can be signalled in the video bitstream at a high level syntax to indicate whether the GMC mode is enabled for the region, wherein the high level syntax is higher than or equal to a level of the current processing unit. A GMC use flag can be incorporated in the video bitstream, where the GMC use flag is within a level of the current processing unit in the video bitstream to indicate whether the GMC mode is applied to the current processing unit. When the GMC use flag indicates the GMC mode is applied to the current processing unit, a global motion index or global motion index delta can be used to identify the global motion model selected from the multiple global motion models for the current processing unit. More than one set of parameters for the global motion model selected from the multiple global motion models can be allowed for the current processing unit and an indication for selecting among the more than one set of parameters can be signalled at a level of the current processing unit in the video bitstream.

According to yet another method, each region can be coded using either selective GMC/LMC (local motion compensation) mode or combined GMC/LMC mode. If the selective GMC/LMC mode is selected for a given region, each processing unit in the given region is coded using either a GMC mode or a LMC mode. If the combined GMC/LMC mode is selected for a given region, each processing unit in the given region is coded using both the GMC mode and the LMC mode together. When the selective GMC/LMC mode is selected for the given region, a flag can be used to indicate whether the GMC mode is used for a processing unit in the given region. If multiple global motion models are allowed for the GMC mode, a global motion index is used to indicate a given global motion model among said multiple global motion models selected for the processing unit. When the combined GMC/LMC mode is selected for the given region, a combined predictor is generated for a processing unit in the given region according to a weighted sum of a GMC predictor generated based on the GMC mode and a LMC predictor generated based on the LMC mode. When the combined GMC/LMC mode is selected for the given region, a GMC motion vector according to the GMC mode can be used as an initial motion vector and the initial motion vector is refined according to the LMC mode to obtain a final motion vector. When a motion vector difference is signalled, the motion vector difference corresponds to a difference between the final motion vector and the initial motion vector. When the GMC mode is selected for the given region, a Merge index can be signalled for the given region to indicate that GMC information of the given region is inherited from or predicted by the GMC information of a previous coded region as pointed by the Merge index, where GMC information comprises parameters associated with the GMC mode. The GMC information for one or more coded regions in an above row is stored and used to derive one or more Merge candidates for the GMC information of the given region, where if a target region among said one or more coded regions in the above row is not coded in the GMC mode, the GMC information from an above region or a left region of the target region is stored at location for the target region.

DETAILED DESCRIPTION OF THE INVENTION

Figure 1:
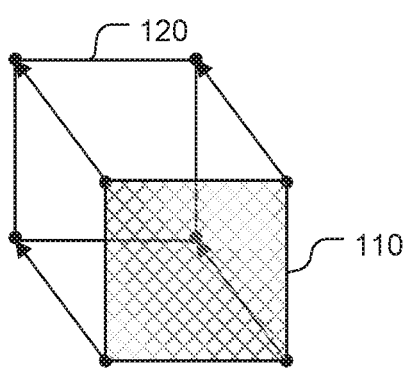
FIG. 1 illustrates an example of translational global motion model.
Figure 2:
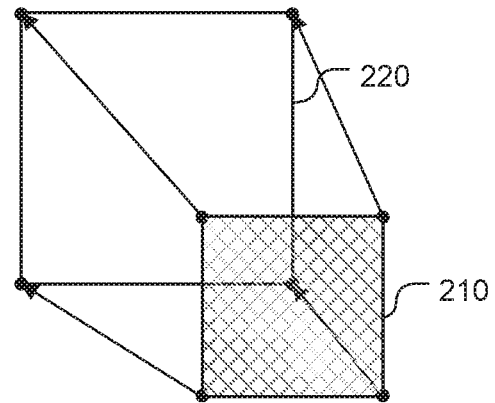
FIG. 2 illustrates an example of scaling global motion model.
Figure 3:
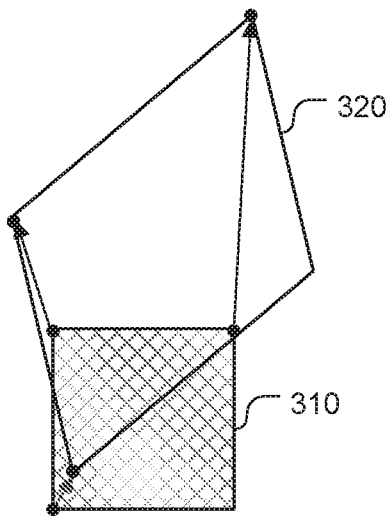
FIG. 3 illustrates an example of affine global motion model.

The following description is of the best-contemplated mode of carrying out the invention. This description is made for the purpose of illustrating the general principles of the invention and should not be taken in a limiting sense. The scope of the invention is best determined by reference to the appended claims.

Indication of Use of Global Motion Compensation

According to a first method to improve the efficiency of global motion compensation (GMC), the use of global motion compensation can be indicated or signalled in the header of a coded region or unit. The unit consists of a set of pixels for the processing purpose. The unit may also be referred as a processing unit in this disclosure. The unit may be a coding or prediction block, a group of coding or prediction blocks (e.g. coding tree block, CTU), a slice, a group of slices, a tile, a part of a picture, a picture, a group of pictures, or the entire video sequence. If the use of global motion compensation is enabled in a given unit, then global motion compensation may be used within this unit. Otherwise, global motion compensation will not be used for this unit. Examples of signalling GMC may be in the level shown as follows, but not limited to:

per sequence (e.g. an enabling flag indicating whether GMC is enabled signalled at sequence parameter set (SPS))

per picture (e.g. an enabling flag indicating whether GMC is enabled signalled at picture parameter set (PPS))

per slice (e.g. an enabled flag indicating whether GMC is enabled signalled at slice header)

per tile or wavefront (e.g. a row of basic processing units, such as CTU)

per region, including the following:
  a group of basic process units (e.g. a consecutive number of CTUs).
  a given size of array (e.g. a 3×5 CTU array)

per block (e.g. a prediction unit)

In one embodiment, a two-level approach may be used. The enabling flag can be signalled at a high level (e.g. a region, slice header, PPS or SPS). The enabling flag may also be signalled at a block level. When the enable flag at the high level is set to be ON (i.e., GMC is enabled), a flag (e.g. a use flag) may be used at the beginning of each unit to indicate whether GMC is used or not in this unit. When the use flag is not present, this use flag is inferred to be OFF (i.e., GMC is not used in this unit).

Representation of Global Motion

The second method addresses representation of global motion. Upon the use of GMC, if the use flag indicates that GMC is used for the current unit, the global motion parameters are signalled. In one embodiment, only one global motion model is allowed to be used in the current unit. In this case, there is no need to indicate the total number of global motion models nor the particular global motion model selected. The global motion parameters are signalled one by one. For example, if the global motion model is an affine motion model with six parameters, these six parameters are coded and signalled one by one in a certain order (e.g. a0, a1, a2, b0, b1, b2) following the GMC use flag.

Exemplary syntax tables are shown below in Table 1a, Table 1b and Table 2. In Table 1a and Table 1b, the higher level (e.g. SPS or PPS) syntax is shown.

TABLE 1a

| | Note |
|---|---|
| ...... | |
|     global_motion_enabled_flag /* global motion is signalled at higher level syntax */ | |
|     if(global_motion_enabled_flag) { | |
|         mum_params /* i.e., the number of parameters for the global motion model used*/ | 1-1 |
|         for( pIdx = 0; pIdx < num_params; pIdx++ ) | |
|             global_motion_parameters[ pIdx ] /* signalled global parameters */ | 1-2 |
|     } | |

TABLE 1b

| | Note |
|---|---|
| ...... | |
|     global_motion_enabled_flag /* global motion is signalled at higher level syntax */ | |
|     if(global_motion_enabled_flag) { | |
|         motion_type | 1-3 |
|         for( pIdx = 0; pIdx < num_params [motion_type]; pIdx++ ) /* i.e., the number of parameters for the global motion model used*/ | 1-4 |
|             global_motion_parameters[ pIdx ] /* signalled global parameters */ | 1-5 |
|     } | |

In Table 1a, the number of parameters for the global motion model used (i.e., mum_params) is signalled as shown in Note (1-1). The global motion parameters are signalled as shown in Note (1-2). In Table 1b, instead of signalling the number of parameters for this global motion model, the type of global motion model is signalled as shown in Note (1-3). A mapping table (i.e., num_params [motion_type] as indicated by Note (1-4)) between the motion type and the number of parameters for this type can be established. The global motion parameters are signalled as shown in Note (1-5).

In Table 2, a lower level (e.g. slice payload or coding unit) syntax is shown, the flag use_global_motion_flag is signalled as indicated by Note (2-1) if flag global_motion_enabled_flag is set to 1 (i.e., GMC is enabled).

TABLE 2

| | Note |
|---|---|
| ...... | |
|     if( global_motion_enabled_flag ) | |
|         use_global_motion_flag /* indication of the use of global motion in current unit */ | 2-1 |
| ...... | |

In one embodiment, the syntax element, use_global_motion_flag is signalled for each coding block. The flag can be coded with context from a top and/or left neighbour. For example, if the values of use_global_motion_flag for both top and left neighbours are 1 (i.e., GMC is used), a first context is assigned; if the values of use_global_motion_flag for both top and left neighbours are 0 (i.e., GMC is not used), a second context is assigned; and if the value of use_global_motion_flag is 1 for only one of the two neighbours, a third context is assigned. In another embodiment, the flag can be coded with context from a previously coded block. For example, only one context can be used to code this flag. For each block, the CABAC status of this context is updated by using the value of use_global_motion_flag for current block. In yet another embodiment, this flag use_global_motion_flag is by-pass coded without using any context.

In another embodiment, more than one global motion models may be used in the current unit. In this case, each global motion model is assigned an index. For example, three global motion models may be used in the current unit (e.g. a video sequence). The global motion models may be assigned indices 0, 1 and 2 and the indices may be encoded using variable-length codewords such as 0, 10 and 11. The maximum number of global motions allowed in one unit may be pre-defined and signalled in a high level syntax header (e.g. SPS, PPS, slice header, etc.). An exemplary syntax to support global motion index and global motion parameters is shown in Table 3, where the GMC is enabled as indicated by flag global_motion_enabled_flag in Note (3-1), the number of global motion models (as indicated by Note (3-2)) used and the number of global motion parameters (as indicated by Note (3-3)) for each global motion model are signalled. The parameters for each global motion model are signalled as indicated by Note (3-4).

TABLE 3

|  | Note |
|---|---|
| global_motion_enabled_flag /* global motion is signalled at higher level syntax */ ......  if(global_motion_enabled_flag) {      num_global_motion /* indicating the number of global motion model allowed in a lower unit*/      for( nIdx = 0; nIdx < num_global_motion; nIdx++ ) {          num_params /* num_params is the number of parameters for each of the global motion model used. For each nIdx, num_params can be different*/          for( pIdx = 0; pIdx < num_params; pIdx++ )              global_motion_parameters [ pIdx ] /* signalled global moition parameters */      }  } |  3-1 3-2  3-3  3-4 |

Alternatively, for each global motion model, the motion type can be signalled. A mapping table between the motion type and number of parameters can be used instead of signalling the number of parameters used for each global motion model. Table 4 illustrates an example of mapping between motion_type and num_params. In this example, the "motion_type" is binarized using variable length codes.

TABLE 4

| motion_type | motion_type binarization | num_params | notes: |
|---|---|---|---|
| 0 | 0 | 2 | Translational motion model |
| 1 | 10 | 4 | Scaling motion model |
| 2 | 110 | 6 | Affine motion model |

TABLE 4-continued

| motion_type | motion_type binarization | num_params | notes: |
|---|---|---|---|
| 3 | 111 | 8 | Perspective motion model |
| ... | ... | ... | ... |

Table 5 illustrates an example of syntax table for global motion parameter signalling using the number of global motion models and motion_type for each global motion model. When the GMC is enabled as indicated by flag global_motion_enabled_flag in Note (5-1), the number of global motion models (as indicated by Note (5-2)) used and the motion_type (as indicated by Note (5-3)) for each global motion model are signalled. The parameters for each global motion model are signalled as indicated by Note (5-4).

TABLE 5

|  | Note |
|---|---|
| global_motion_enabled_flag /* global motion is signalled at higher level syntax */ ......  if(global_motion_enabled_flag) {      num_global_motion /* indicating the number of global motion models allowed in a lower unit*/      for( nIdx = 0; nIdx < num_global_motion; nIdx++ ) {          motion_type /* motion_type is the motion type for each of the global motion model used. */          for( pIdx = 0; pIdx < numParams[motion_type]; pIdx++ ) /* numParams is the number of parameters for each of the global motion models used. For each nIdx, numParams[motion_type] can be different*/              global_motion_parameters [ pIdx ] /* signalled global parameters */      }  } | 5-1 5-2  5-3  5-4 |

In another embodiment, when multiple sets of global motion parameters are signalled in a higher level header (e.g. SPS, PPS, or slice header), a lower level unit (e.g. slice, region of blocks, coding tree, coding or prediction block) may refer the selected global motion model as indicated in the higher level header. The lower level unit may use the global motion index to identify the particular global motion model to be used in the lower level. In other words, the global motion model that is associated with the global motion index is applied to the current lower level unit. An exemplary syntax for signalling of global motion model using a flag (as indicated by Note (6-1)) and index (as indicated by Note (6-2)) of the selected global motion in a lower level is shown in Table 6.

TABLE 6

| | Note |
|---|---|
| if( global_motion_enabled_flag ) /* global motion is signalled at higher level syntax */ | |
|     use_global_motion_flag /* indication of the use of global motion model in current lower unit */ | 6-1 |
| if(use_global_motion_flag) { | |
|     global_motion_idx /* index pointing to the paricular global motion model signalled at higher level syntax */ | 6-2 |
| } | |

In one embodiment, the "global_motion_idx" is signalled for each coding block. It can be binarized using variable length codes. For example, the binarization can be based on exponential-Golomb codes. Alternatively, the binarization may use fixed length codes. In this case, the maximum number of global motion models is assumed to be known by both the encoder and decoder, or the maximum number can be signalled at higher level syntax. For example, the maximum number of global motion allowed is set to be 16 at SPS or PPS or slice header, or is assumed by both the encoder and decoder to be 16. Accordingly, 4-bit fixed length codes can be used to binarize global_motion_idx.

The binarized strings (i.e., bins) for global_motion_idx can be coded with context from its top and/or left neighbours. An example of the context assignment for coding a given bin is as follows: if the values of this bin of global_motion_idx for both top and left neighbours are 1, a first context is assigned; if the values of this bin of global_motion_idx for both top and left neighbours are 0, a second context is assigned; and if the value of this bin of global_motion_idx is 1 for only one of the two neighbours, a third context is assigned. In another embodiment, a bin is coded with context from a previously coded block. In this case, only 1 context is used to code this bin. For each block, the CABAC status of this context is updated by using the value of this bin of global_motion_idx for the current block. In yet another embodiment, all bins of global_motion_idx are by-pass coded without using any context.

In another embodiment, the index difference between current index and a previous index is signalled. Exemplary syntax is shown in Table 7, where the delta index (i.e., global_motion_idx_delta as shown in Note (7-1)) corresponds to the difference between the global motion index of a current block and the global motion index of a previous block.

TABLE 7

| | Note |
|---|---|
| if( global_motion_enabled_flag ) /* global motion is signalled at higher level syntax */ | |
|     use_global_motion_flag /* indication of the use of global motion model in current lower unit */ | |
| if(use_global_motion_flag) { | |
|     global_motion_idx_delta /* index pointing to the paricular global motion model signalled at higher level syntax */ | 7-1 |
| } | |

In this example, the decoded global motion index (globalMotionIdx) is derived as follows:

globalMotionIdx=globalMotionIdxPrev+global_motion_idx_delta.

Variable globalMotionIdxPrev represents the previous globalMotionIdx. When it is first time invoked, the initialized value of globalMotionIdxPrev is 0. Each time after the globalMotionIdx is derived, globalMotionIdxPrev is set to be globalMotionIdx.

Since global_motion_idx_delta represents the difference between two indices, it could be either positive or negative. Therefore, this syntax may contain the sign information. For example, the first bin of this syntax is its sign and the following bins are used to represent its absolute value.

From a higher level header down to the block level, there could be multiple available global motion models and parameters candidates to choose from. During the coding process, new global motion models and/or the parameters can be updated from implicit derivation or direct signalling. In one embodiment, at the beginning of coding a sequence, an initial global motion model and/or parameters candidate list can be constructed and signalled at SPS. The list consists of a number of sets of motion models and/or their parameters. After coding of one picture, the motion model and/or parameters derived from the current picture are added to the candidate list. The derived new candidates can be either implicitly placed into the candidate list or explicitly signalled to update the candidate list. The updated candidate list will be used for coding the following pictures. In case that multiple candidates are used for one unit, the number of the candidates may need to be signalled. For the update process of the GMC candidate list from one unit to another (such as from one picture to another), if explicit signalling of new candidates are used, the number of new candidates may need to be signalled.

If multiple sets of candidate motion models and/or parameters are used in one unit, a lower level unit may choose to reduce the number of possible candidates by using explicit signalling or implicit derivation. If the explicit signalling method is used, a subset of the potential candidates is marked such that only this subset will be used for the specific lower level unit. Therefore, the signalling cost of choose a candidate is reduced. If implicit signalling is used, a list (in terms of number of candidates) smaller than the full list can be used. For each update, only those highly possible candidates are chosen for inclusion in the smaller list. The selection process can be separately defined. For example, the selection process can be based on the order of number of occurrence in previously coded unit. After the number of candidates is reduced, if there is only one candidate left, there is no need to signal the candidate selected. Otherwise, an index flag may be used to signal the candidates used for the current unit.

In the above two methods (i.e., implicit and explicit signalling the choices of candidate list) for reducing the number of potential candidate list, a combination of these two methods can be used. For example, after implicitly choosing a smaller number of candidates from the full list, explicit signalling can be used to indicate some additional candidates to be used for the following unit, where the additional candidates do not exist in the list formed by implicit signalling.

In one embodiment, N sets of motion parameters of affine motion model are signalled in a sequence header, where N is a positive integer value. Some additional sets of motion parameters can be updated at the picture header (e.g. M additional sets). An index array pointing to the entries of these (M+N) sets can be signalled at a slice header to indicate that only those entries are to be used in this slice.

The parameters for a given motion model can be signalled using either of the following methods:

Signal the motion vectors of some representative positions in the unit. Each motion vector has two components, which are equivalent to two parameters.

Signal the model parameter directly, instead of motion vectors.

Use a combination of signalled motion vectors and derived motion vectors,
For example, for 6-parameter model used in one unit, 3 motion vectors are needed. Out of the three motion vectors, two motion vectors can be signalled explicitly while another one is derived using some motion vector prediction from spatial/temporal neighbouring units.

Use a combination of signalled parameters and derived parameters.

The signalling of GMC parameters/motion types can be done in a predictive fashion by using existing motion parameters/motion types as predictors and only signalling the differences. Alternatively, a flag can be used to indicate whether current motion parameters/motion types can be exactly predicted from existing ones or new motion parameters/motion types need to be signalled. The exact prediction of motion parameters/motion types implies that the existing parameters/motion types can be used as the current motion parameters/motion types and there is no need to signal the differences. In one embodiment, the signalling unit is one CTU (coding tree unit). When signalling the GMC parameters/motion types of the current CTU, the GMC parameters/motion types from the left, top or temporally collocated CTU can be used as a predictor. A flag can be used to signal whether the GMC parameter/motion types of the current CTU's are to be derived from these predictors. If the flag indicates "yes", another index flag is used to signal which of the predictors is to be used. If the flag indicates "no", a new set of parameters/motion type is signalled.

In this invention, the number of parameters for a global motion may be flexible. For example, typically 6 parameters are required for the affine motion model. However, with certain assumptions, such as some simplifications, less parameter may be required. For example, if after transformation, the original block can maintain its shape (i.e., still a square or rectangle), the required number of parameters may be reduced to 4 from 6. Therefore, the present methods for global motion types/parameter signalling may include such flexibility on the number of parameters used for each global motion model.

In the context of multiple reference pictures, for a slice (or picture), one or multiple global motions can be used for each of the reference pictures for the current slice (or picture). For the methods and embodiments in this invention, only pictures in list 0 are described. However, it is understood that similar methods and embodiments can be applied to reference pictures in list 1 as well.

In one embodiment, a reference picture at a pre-defined location in the reference picture list is used as the reference picture for global motion compensation. In one example, this reference picture is the collocated picture for the current slice. An exemplary syntax of signalling global motion index is shown in Table 8 for a prediction unit (PU). In this example, when global motion compensation is used, there is no need to signal the reference index for the reference picture since it is assumed to be pre-defined at both the encoder and decoder. The pre-defined reference picture can be a collocated picture, a picture in the first position of the list, etc. In Table 8, whether the global motion compensation is not used is checked as indicated by Note (8-1). If the global motion is not used, the motion information for a regular Inter prediction mode is included as indicated by Note (8-2) through Note (8-3). If the global motion is used, the syntax global_motion_idx is signalled to indicate the global motion index as shown in Note (8-4). While the global motion index as mentioned previously is used in this example, the global motion index delta may also be used.

TABLE 8

|  | Note |
|---|---|
| prediction_unit( x0, y0, nPbW, nPbH ) { | |
| ...... | |
|     if( !use_global_motion_flag ) { /*regular inter mode*/ | 8-1 |
|         if( num_ref_idx_l0_active_minus1 > 0 ) | 8-2 |
|             ref_idx_l0[ x0 ][ y0 ] | |
|         mvd_coding( x0, y0, 0 ) | |
|         mvp_l0_flag[ x0 ][ y0 ] | 8-3 |
|     } | |
|     else { | |
|         global_motion_idx /* signal which of the global motions model is used, can also use global_motion_idx_delta here*/ | 8-4 |
|     } | |
| ...... | |
| } | |

In another embodiment, multiple global motion models are allowed for a current picture or slice. In particular, one set of global motion parameters are signalled or derived for each of reference pictures. Therefore, when one particular reference picture is selected for current block (e.g. by using a reference picture index), then the corresponding set of global motion parameters is inferred to be used when global motion compensation is used for this block. There is no need to signal which set of global motion parameters is used. An exemplary syntax for signalling of global motion compensation in a prediction unit is shown in Table 9. In Table 9, when the Inter prediction block does not use global motion compensation as indicated by Note (9-1), motion information is signalled in Notes (9-2) and (9-3). Otherwise, no motion information is signalled.

TABLE 9

|  | Note |
|---|---|
| prediction_unit( x0, y0, nPbW, nPbH ) { | |
| ...... | |
|     if( inter_pred_idc[ x0 ][ y0 ] != PRED_L1 ) { | |

TABLE 9-continued

|  | Note |
|---|---|
|         if( num_ref_idx_l0_active_minus1 > 0 ) | |
|             ref_idx_l0[ x0 ][ y0 ] | |
|         if( !use_global_motion_flag ) { | 9-1 |
|             mvd_coding( x0, y0, 0 ) | 9-2 |
|             mvp_l0_flag[ x0 ][ y0 ] | 9-3 |
|         } | |
|     } | |
| ...... | |
| } | |

In yet another embodiment, regardless whether the global motion compensation is used, the reference picture index in the reference picture list is signalled. An exemplary syntax for signalling of global motion compensation in prediction unit is shown in Table 10. In Table 10, when global motion compensation is used (i.e., the case indicated by Note (10-1)), syntax global_motion_idx is signalled as indicated by Note (10-2).

TABLE 10

|  | Note |
|---|---|
| prediction_unit( x0, y0, nPbW, nPbH ) { | |
| ...... | |
|     if( inter_pred_idc[ x0 ][ y0 ] != PRED_L1 ) { | |
|         if( num_ref_idx_l0_active_minus1 > 0 ) | |
|             ref_idx_l0[ x0 ][ y0 ] | |
|         if( !use_global_motion_flag ) { | |
|             mvd_coding( x0, y0, 0 ) | |
|             mvp_l0_flag[ x0 ][ y0 ] | |
|         } | |
|         else { | 10-1 |
|             global_motion_idx /* signal which of the global motions model is used, can also use global_motion_idx_delta here*/ | 10-2 |
|         } | |
|     } | |
| ...... | |
| } | |

Use of Global Motion Compensation with Local Motion Compensation

Global motion compensation can be used with local motion compensation selectively or in a combined fashion. The selective GMC (global motion compensation)/LMC (local motion compensation) mode can be implemented by segmenting a current picture (or slice or regions) into regions. The GMC mode or LMC mode is selected for each region. For the regions using the GMC mode, the signalled model types/parameters are applied to these regions. For the regions using the LMC mode, regular MVs can be applied to each block within the region, where the MVs can be explicitly signalled or inferred by prediction. In one embodiment, a flag (e.g. "use_global_motion_flag") is used to indicate whether GMC is used for the current unit. If the flag is ON (i.e., GMC is used) and there is only one global motion model signalled in the higher level syntax header, this global motion model is used for prediction and compensation for this unit without the need for additional signalling to identify the global motion model. If there is more than one global motion models signalled in the higher level syntax header, a global motion index is signalled in addition to the syntax flag "use_global_motion_flag". The global motion associated to this motion index is applied to the current unit within the region. If the "use_global_motion_flag" is OFF (i.e., GMC is not used), then local motion vectors are signalled and used for the current unit and conventional motion compensation is applied.

The flag for indicating whether a region uses GMC mode or LMC mode can be explicitly signalled. The flag may also be determined implicitly by analysing whether the current region is likely to have GMC mode. If yes, the model type and/or global motion index and/or parameters for this region can be signalled if necessary or derived without using the explicit flag. The same analysis should be performed at both the encoder and decoder sides to synchronize the signalling or derivation of model type and/or parameters. An exemplary syntax table with only one global motion model is shown in Table 11. As shown in Table 11, only the flag use_global_motion_flag is signalled as indicated by Note (11-1) without global motion index to identify the global motion model.

TABLE 11

| | Note |
|---|---|
| for( addr = 0; addr < totalNumOfUnit; addr++ ) { /* go over each of the units*/<br>    use_global_motion_flag /* indication of the use of global motion<br>       in current lower unit */<br>    if(use_global_motion_flag) {<br>       ....../* apply global motion to this unit */<br>    }<br>    else{<br>       ....../* apply local motion to this unit */<br>    }<br>} | 11-1 |

An exemplary syntax with multiple sets of global motion models is shown in Table 12. As shown in Table 12, the flag use_global_motion_flag is signalled as indicated by Note (12-1). If the flag use_global_motion_flag is asserted as indicated by Note (12-2), the additional syntax global_motion_idx is signalled as indicated by Note (12-3)

TABLE 12

| | Note |
|---|---|
| for( addr = 0; addr < totalNumOfUnits; addr++ ) { /* go over each of the units*/ | |
|     use_global_motion_flag /* indication of the use of global motion in current<br>       lower unit */ | 12-1 |
|     if(use_global_motion_flag) { | 12-2 |
|        global_motion_idx /* index pointing to the paricular global moition model<br>signalled at higher level syntax */ | 12-3 |
|        ....../* apply global motion to this unit */<br>    }<br>    else)<br>       ....../* apply local motion to this unit */<br>    }<br>} | |

In one embodiment, global motion or local motion can be assigned to each block (for example, 4×4 block), or even per pixel, which is supported as the smallest block size for motion compensation.

The combination method (referred to as the combined GMC/LMC mode) can be implemented as follows. In the first embodiment, the prediction sample indicated by global motion and the prediction sample indicated by local motion are combined together to form the final prediction sample for the current block. For example, the combined prediction Pred(x, y) can be determined according to:

Pred(x,y)=weight1*Pred_global(x,y)+weight2*Pred_local(x,y).

In the above equation, Pred_global (x, y) is the prediction sample generated by the GMC mode, Pred_local (x, y) is the prediction sample generated by the LMC mode, weight1 and weight2 are weights applied to the two prediction samples respectively. According to this embodiment, besides signalling global motion compensation use flag (and possibly the index of global motion model used), there is no need to change the prediction unit syntax. When the combined GMC/LMC mode is selected for the current block, the decoder can perform both global motion compensation and local motion compensation and combine both compensations.

In the second embodiment, local motion compensation is used based on top of global motion compensation. In other words, the local motion according to the LCM mode is measured with respect to the global motion according to the GMC mode. According to this embodiment, the decoded motion vector difference for the current block will be added to the already known global motion to determine the absolute motion of the current block. From another point of view, the local motion is treated as a refinement to the existing global motion. An exemplary syntax with only one global motion model for combined global motion and local motion for the prediction unit is shown in Table 13. As shown in Table 13, when the Inter prediction does not use reference list 1, the reference picture index for list 0 (i.e., ref idx_l0 [x0][y0]) is signalled as indicated by Note (13-1) and (13-2) if there are more than one reference picture in the list. The MV difference is signalled in Note (13-3). Whether flag use_global_motion_flag is not asserted is checked in Note (13-4). If flag use_global_motion_flag is not asserted (i.e., local motion), syntax mvp_l0_flag[x0][y0] is signalled as indicated by Note (13-5), where mvp_l0_flag[x0][y0] specifies the motion vector predictor index of list 0 for block location (x0, y0).

TABLE 13

|  | Note |
| --- | --- |
| prediction_unit( x0, y0, nPbW, nPbH ) { |  |
| ...... |  |
| if( inter_pred_idc[ x0 ][ y0 ] != PRED_L1 ) { |  |
|     if( num_ref_idx_l0_active_minus1 > 0 ) |  |
|         ref_idx_l0[ x0 ][ y0 ] | 13-1 |
|     mvd_coding( x0, y0, 0 ) | 13-2 |
|  | 13-3 |
|     if( !use_global_motion_flag ) | 13-4 |
|         mvp_l0_flag[ x0 ][ y0 ] | 13-5 |
| } |  |
| ...... |  |
| } |  |

In this example, when global motion is not used (i.e., use_global_motion_flag equal to 0), the index for a motion vector prediction candidate is signalled. The decoder will add the decoded MV difference to the motion vector predictor to form the decoded MV for current block. Otherwise, when global motion is used (i.e., use_global_motion_flag equal to 1), the decoder will add the decoded MV difference to the global motion vector predictor to form the decoded MV for the current block. The global motion comes from the global motion model.

An exemplary syntax with multiple sets of global motion models for combined GMC and local motion is shown in Table 14 for the prediction unit level. Table 14 is similar to Table 13. However, syntax global_motion_idx[x0][y0] is signalled as indicated by Note (14-1) to select a global motion model from the multiple sets of global motion models when use_global_motion_flag has a value of 1.

TABLE 14

|  | Note |
| --- | --- |
| prediction_unit( x0, y0, nPbW, nPbH ) { |  |
| ...... |  |
|     if( inter_pred_idc[ x0 ][ y0 ] != PRED_L1 ) { |  |
|         if( num_ref_idx_l0_active_minus1 > 0 ) |  |
|             ref_idx_l0[ x0 ][ y0 ] |  |
|         mvd_coding( x0, y0, 0 ) |  |
|         if( !use_global_motion_flag ) |  |
|             mvp_l0_flag[ x0 ][ y0 ] |  |
|         else |  |
|             global_motion_idx[ x0 ][ y0 ] | 14-1 |
|     } |  |
| ...... |  |
| } |  |

In this example, when global motion is not used (i.e., use_global_motion_flag equal to 0), the index for motion vector prediction candidates is signalled. The decoder will add the decoded MV difference to the selected motion vector predictor to form the decoded MV for current block. Otherwise, when global motion is used (i.e., use_global_motion_flag equal to 1), the index for motion vector prediction candidates is signalled, which come from the global motion models. The decoder will add the decoded MV difference to the selected global motion vector predictor to form the decoded MV for the current block.

In a third embodiment, global motion is subtracted from local motion. In this way, besides signalling the global motion use flag (and possibly the index of global motion used), there is no need to change the prediction unit syntax. When global motion is in use, the decoder may have both a global motion vector and a local motion vector, and subtract the local motion vector from the global motion vector, or the other way around. For example, the final motion vector MV can be derived from:

$MV=(lmvx-gmvx, lmvy-gmvy)$.

In the above equation, the global motion vector GMV is represented by (gmvx, gmvy) and the decoded local motion vector LMV is represented by (lmvx, lmvy). An exemplary syntax with multiple sets of global motion models is shown below in Table 15 for the prediction unit level, where if the Inter prediction does not use list 1 reference as indicated by Note (15-1) and if flag use_global_motion_flag has a value of 1 as indicated by Note (15-2), syntax global_motion_idx [x0][y0] is signalled as indicated by Note (15-3).

TABLE 15

| | Note |
|---|---|
| prediction_unit( x0, y0, nPbW, nPbH ) { | |
| ...... | |
|     if( inter_pred_idc[ x0 ][ y0 ] != PRED_L1 ) { | 15-1 |
|         if( use_global_motion_flag ) | 15-2 |
|             global_motion_idx[ x0 ][ y0 ] | 15-3 |
|         if( num_ref_idx_l0_active_minus1 > 0 ) | |
|             ref_idx_l0[ x0 ][ y0 ] | |
|         mvd_coding( x0, y0, 0 ) | |
|             mvp_l0_flag[ x0 ][ y0 ] | |
|     } | |
| ...... | |
| } | |

In Table 15, the flag use_global_motion_flag may be signalled at a syntax level higher than the prediction unit level, such as coding unit syntax. Alternatively, the flag use_global_motion_flag may be signalled somewhere in the same level. In this example, even when global motion is used, the local motion still needs to be decoded.

In the Merge candidate list construction, if the Merge index points to a position that is coded in the GMC mode and finally this Merge index is selected and signalled to the decoder, the global motion/parameters of this pointed position will be inherited and used for the current block. The inherited global motion/parameters may be subject to additional processing, such as motion vector scaling, reference picture adjustment, conversion between bi-prediction and uni-prediction. In this case, no explicit signalling flag is required to indicate that the current block uses GMC instead of local motion compensation.

Regarding the storage of GMC information (e.g. model type and/or parameters), the following methods according to the present invention are disclosed. According to one method, a row buffer is used to store the parameter of GMC from an above row (e.g. units of CTU, or CU). For example, if the current CTU is not coded using GMC, the storage for this location will copy the information from its top or left CTU. In such a way, local motion area can be excluded from the global motion compensation information update process. The prediction of this inherited information can be in the Merge mode or regular predictive mode.

Figure 4:
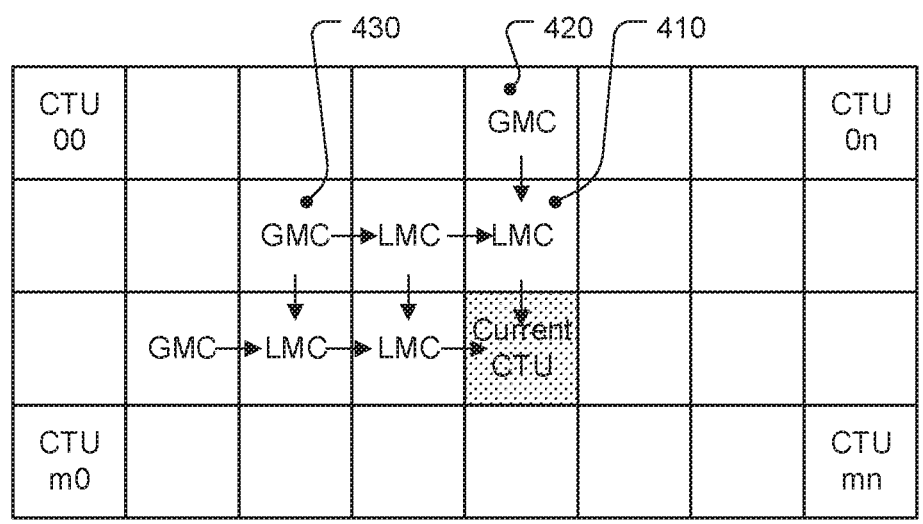
FIG. 4 illustrates an example of storing global motion information for an above row of regions and regions prior to a current region in a same row of regions.

An example to illustrate the above scheme is shown in FIG. 4. In this example, the neighbouring CTUs of the current CTU are not coded in the GMC mode. To predict the motion type and/or parameters of current CTU coded in the GMC mode, the information of faraway GMC coded CTUs may be used. This is done by propagating the neighbouring (top and left) CTUs to inherit the GMC information from their neighbouring CTUs if any of the neighbours is not coded in the GMC mode. For example, the neighbouring CTU 410 above the current CTU does not have the GMC information since it is coded using the local motion compensation (LMC). The GMC information stored for the above CTU 410 may come from the CTU 420 above the CTU 410 or the CTU 430 that is two CTUs to the left of CTU 410.

Alternatively, a buffer is reserved to store the most recent GMC information from the coded units. In this buffer, one or multiple sets of GMC information may be stored. If there is only one set of motion information stored, the buffer is updated only when current unit is coded in the GMC mode. If there are more than one set of motion information stored in the buffer, the motion information of current unit will be put into the buffer if current unit is coded in the GMC mode. If the buffer size is fixed or limited, a non-duplicated set may be removed from the buffer using different approaches. For example, the first-in-first-out rule may be used to remove the oldest set in the buffer.

Encoder Design

Several methods are disclosed here regarding how to derive the global motion information.

In one method, a pre-segmentation is done to differentiate the global (i.e., background) motion and local (i.e., foreground) motion areas. According to this method, a global motion or multiple global motions is assumed first. In one embodiment, the pixel correspondence between the current picture and the reference picture is established to calculate the global motion parameters. In another embodiment, small block-size motion estimation is performed to obtain pixel correspondence between a reference pixel and a current pixel (i.e., (A', A) pair). The location information of the pairs is used to calculate the motion model and parameters. The calculation can be based on:

Pixels in full resolution,
Pixels in a sub-sampled resolution to reduce computational complexity, or
Pixels that represent a certain size block, such as the left-top/centre pixel of a block in the parameter calculation.

For the derived global motion and parameters, the global motion compensation can be applied to each of the blocks/regions in the current picture to find its corresponding reference block/region in the reference picture. The distortion between the two blocks/regions is compared and a decision is made according to:

If the distortion is small (e.g. smaller than a given threshold), this block/region is considered as having global motion
If the distortion is large (e.g. larger than a given threshold), this block/region is considered as having local motion Based on the global motion/local motion decision, also depending how large each unit is defined, a flag can be signalled to indicate whether or not this unit may apply GMC. If the unit belongs to a global motion area or region, the flag can be signalled for the unit.

Different regions within the same picture may apply individual global motion. In this case, the derivation of global motion can be region based. In other words, only pixels in a given region are accounted for the model and parameters calculation.

In the above derivation of global motion type/parameters, iterative process can be used to optimize the derivation. For example, after some regions are identified as not suitable for GMC, these regions can be excluded from calculating the motion type/parameters. The derivation process can be applied again using the updated regions. Therefore, a more accurate set of global motion information can be derived.

In another example, for a set of derived motion parameters, the derivation process may focus on one parameter as a variable to be optimized while assuming other parameters are already optimal. Optimization is performed on this parameter to determine whether a delta value added to the parameter will result in overall improvement for the model. For example, the improvement may be in terms of reduction in overall distortion between current unit and the reference pixels.

In yet another example, for a set of signalled motion vectors, one or more motion vectors can be adjusted to determine if any adjustment can result in overall improvement for the model. For example, the improvement may be in terms of reduction in the overall distortion between current unit and the reference pixels.

In another method, the derivation of global motion type/parameters and the optimization can be achieved by applying technologies such as deep learning or machine learning.

Figure 5:
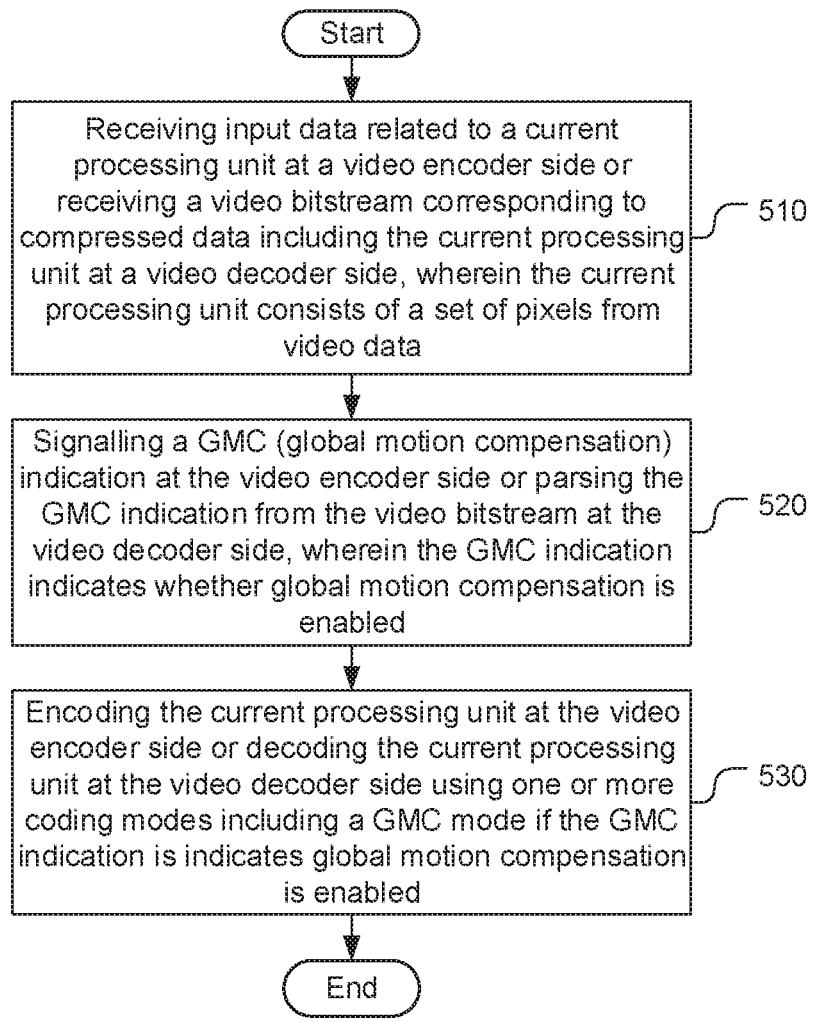
FIG. 5 illustrates a flowchart of an exemplary coding system that signals a GMC (global motion compensation) indication at the video encoder side or parses the GMC indication from the video bitstream at the video decoder side, where the GMC indication indicates whether global motion compensation is enabled.

FIG. 5 illustrates a flowchart of an exemplary coding system that signals a GMC (global motion compensation) indication at the video encoder side or parses the GMC indication from the video bitstream at the video decoder side, where the GMC indication indicates whether global motion compensation is enabled. The method receives input data related to a current processing unit at a video encoder side or receiving a video bitstream corresponding to compressed data including the current processing unit at a video decoder side in step 510, where the current processing unit consists of a set of pixels from video data. A GMC (global motion compensation) indication is signalled at the video encoder side or parsed from the video bitstream at the video decoder side in step 520, where the GMC indication indicates whether global motion compensation is enabled. The current processing unit is encoded at the video encoder side or decoded at the video decoder side using one or more coding modes including a GMC mode if the GMC indication indicates GMC is enabled in step 530.

Figure 6:
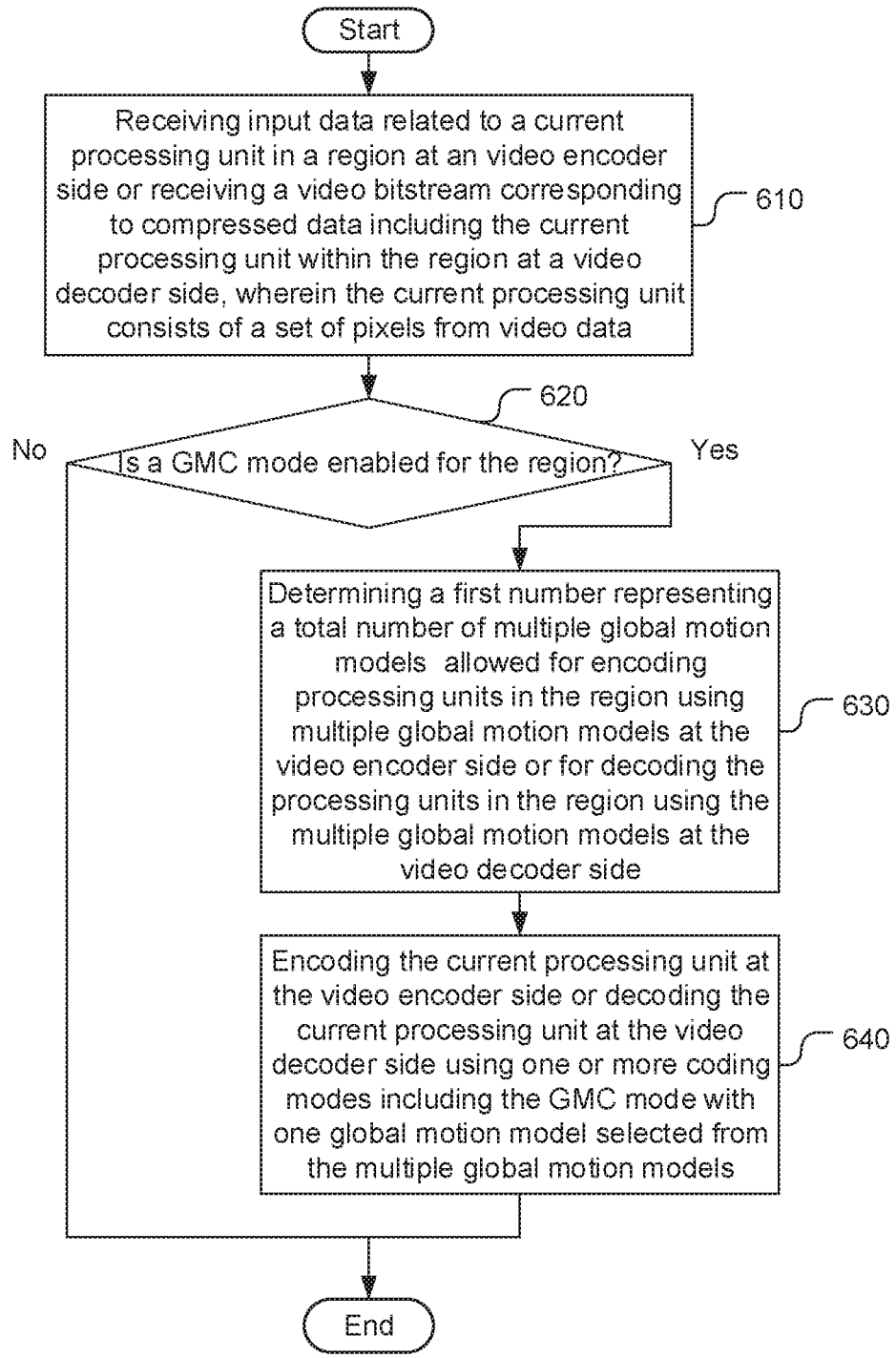
FIG. 6 illustrates a flowchart of an exemplary coding system according to the present invention, where the number of multiple global motion models allowed is incorporated in the video bitstream.

FIG. 6 illustrates a flowchart of an exemplary coding system according to the present invention, where the number of multiple global motion models allowed is incorporated in the video bitstream. The method receives input data related to a current processing unit in a region at a video encoder side or receives a video bitstream corresponding to compressed data including the current processing unit within the region at a video decoder side in step 610, where the current processing unit consists of a set of pixels from video data. Whether a GMC (global motion compensation) mode is enabled for the region is checked in step 620. If the result is "yes", steps 630 and 640 are performed. Otherwise (i.e., the "no" path), steps 630 and 640 are skipped. In step 630, a first number is determined, which represents a total number of multiple global motion models allowed for encoding processing units in the region using multiple global motion models at the video encoder side or for decoding the processing units in the region using the multiple global motion models at the video decoder side. In step 640, the current processing unit is encoded at the video encoder side or decoded the current processing unit at the video decoder side using one or more coding modes including the GMC mode with one global motion model selected from the multiple global motion models.

Figure 7:
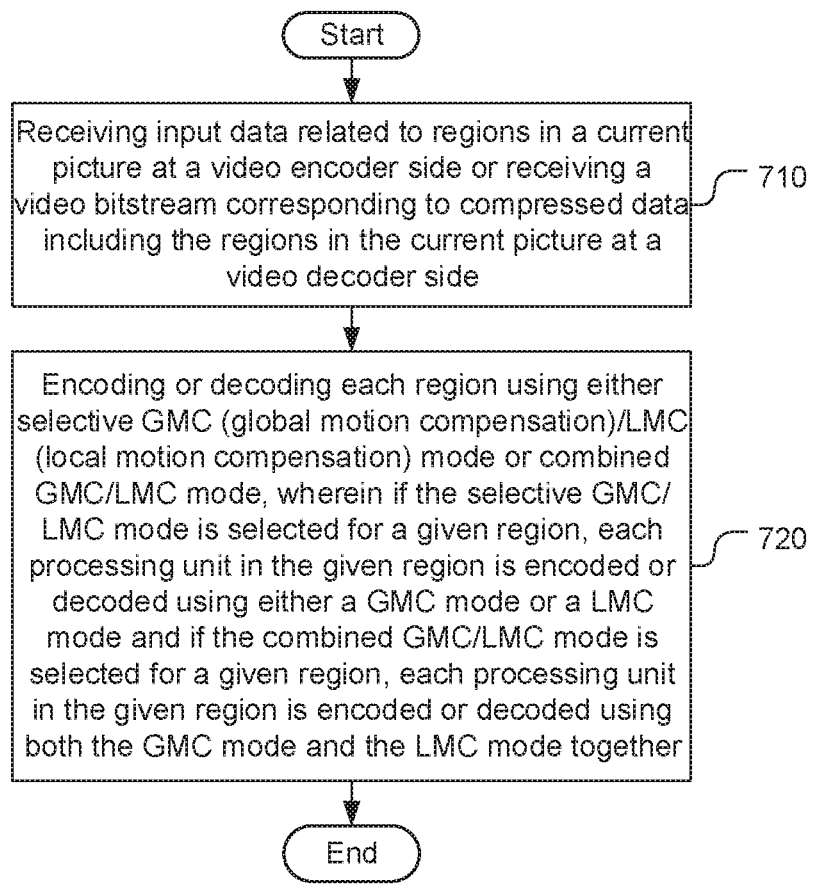
FIG. 7 illustrates a flowchart of an exemplary coding system according to the present invention, where the GMC (global motion compensation) and LMC (local motion compensation) are applied selectively or combined.

FIG. 7 illustrates a flowchart of an exemplary coding system according to the present invention, where the GMC (global motion compensation) mode and LMC (local motion compensation) mode are applied selectively or combined. The method receives input data related to regions in a current picture at a video encoder side or receiving a video bitstream corresponding to compressed data including the regions from the current picture at a video decoder side in step 710. Each region is encoded or decoded using either selective GMC (global motion compensation)/LMC (local motion compensation) mode or combined GMC/LMC mode in step 720, where if the selective GMC/LMC mode is selected for a given region, each processing unit in the given region is encoded or decoded using either a GMC mode or a LMC mode and if the combined GMC/LMC mode is selected for a given region, each processing unit in the given region is encoded or decoded using both the GMC mode and the LMC together.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method of Inter prediction for video coding performed in a video encoder or a video decoder, the method comprising:

receiving input data related to a current processing unit in a region at a video encoder side or receiving a video bitstream corresponding to compressed data including the current processing unit within the region at a video decoder side, wherein the current processing unit consists of a set of pixels from video data;
if a GMC (global motion compensation) mode is enabled for the region:
determining a first number of multiple global motion models allowed for encoding processing units in the region using multiple global motion models at the video encoder side or for decoding the processing units in the region using the multiple global motion models at the video decoder side, wherein a motion type for each of the multiple global motion models is included in the video bitstream at a high level syntax associated with the region, wherein the motion type is mapped to a corresponding total number of parameters for each of the multiple global motion models, wherein the motion type for a given global motion model is coded predictively by another motion type for the given global motion model associated with a previous coded region, wherein a flag is used to indicate whether the motion type for the given global motion model is exactly predicted by said another motion type for the given global motion model associated with the previous coded region; and
encoding the current processing unit at the video encoder side or decoding the current processing unit at the video decoder side using one or more coding modes including the GMC mode with one global motion model selected from the multiple global motion models.

2. A method of Inter prediction for video coding performed in a video encoder or a video decoder, the method comprising:
receiving input data related to a current processing unit in a region at a video encoder side or receiving a video bitstream corresponding to compressed data including the current processing unit within the region at a video decoder side, wherein the current processing unit consists of a set of pixels from video data;
if a GMC (global motion compensation) mode is enabled for the region:
determining a first number of multiple global motion models allowed for encoding processing units in the region using multiple global motion models at the video encoder side or for decoding the processing units in the region using the multiple global motion models at the video decoder side; and
encoding the current processing unit at the video encoder side or decoding the current processing unit at the video decoder side using one or more coding modes including the GMC mode with one global motion model selected from the multiple global motion models, wherein more than one set of parameters for said one global motion model selected from the multiple global motion models is allowed for the current processing unit and an indication for selecting among said more than one set of parameters is signalled at a level of the current processing unit in the video bitstream.

3. An apparatus of Inter prediction for video coding performed in a video encoder or a video decoder, the apparatus comprising one or more electronic circuits or processors configured to:
receive input data related to a current processing unit in a region at a video encoder side or receive a video bitstream corresponding to compressed data including the current processing unit within the region at a video decoder side, wherein the current processing unit consists of a set of pixels from video data;
if a GMC (global motion compensation) mode is enabled for the region:
determine a first number of multiple global motion models allowed for encoding processing units in the region using multiple global motion models at the video encoder side or for decoding the processing units in the region using the multiple global motion models at the video decoder side; and
encode the current processing unit at the video encoder side or decode the current processing unit at the video decoder side using one or more coding modes including the GMC mode with one global motion model selected from the multiple global motion models, wherein more than one set of parameters for said one global motion model selected from the multiple global motion models is allowed for the current processing unit and an indication for selecting among said more than one set of parameters is signalled at a level of the current processing unit in the video bitstream.

4. A method of Inter prediction for video coding performed in a video encoder or a video decoder, the method comprising:
receiving input data related to a current processing unit in a region at a video encoder side or receiving a video bitstream corresponding to compressed data including the current processing unit within the region at a video decoder side, wherein the current processing unit consists of a set of pixels from video data;
if a GMC (global motion compensation) mode is enabled for the region:
determining a first number of multiple global motion models allowed for encoding processing units in the region using multiple global motion models at the video encoder side or for decoding the processing units in the region using the multiple global motion models at the video decoder side, wherein parameters for each of the multiple global motion models are signalled in the video bitstream at a high level syntax associated with the region at the video encoder side or parsed from the video bitstream at the high level syntax at the video decoder side, wherein the parameters for a given global motion model are signalled predictively in the high level syntax using other parameters for the given global motion model associated with a previous coded region, wherein the previous coded region corresponds to a left region, a top region or a temporally collocated region, wherein a flag is used to indicate whether the parameters for the given global motion model are exactly predicted by said other parameters for the given global motion model associated with the previous coded region; and
encoding the current processing unit at the video encoder side or decoding the current processing unit at the video decoder side using one or more coding modes including the GMC mode with one global motion model selected from the multiple global motion models.

5. The method of claim 2, wherein a second number representing a total number of parameters for each of the multiple global motion models is included in the video bitstream.

6. The method of claim 2, wherein a motion type for each of the multiple global motion models is included in the video bitstream at a high level syntax associated with the region, wherein the motion type is mapped to a corresponding total number of parameters for each of the multiple global motion models.

7. The method of claim 6, wherein the motion type is binarized using variable length codes.

8. The method of claim 6, wherein the motion type for a given global motion model is coded predictively by another motion type for the given global motion model associated with a previous coded region.

9. The method of claim 8, wherein the previous coded region corresponds to a left region, a top region or a temporally collocated region.

10. The method of claim 8, wherein a flag is used to indicate whether the motion type for the given global motion model is exactly predicted by said another motion type for the given global motion model associated with the previous coded region.

11. The method of claim 2, wherein parameters for each of the multiple global motion models are signalled in the video bitstream at a high level syntax associated with the region at the video encoder side or parsed from the video bitstream at the high level syntax at the video decoder side.

12. The method of claim 11, wherein the high level syntax corresponds to SPS (sequence parameter set), PPS (picture parameter set), a slice header, a region, or a block.

13. The method of claim 12, wherein the current processing unit corresponds to a CTU (coding tree unit), a coding block or a prediction block.

14. The method of claim 11, wherein the parameters for a given global motion model are signalled predictively in the high level syntax using other parameters for the given global motion model associated with a previous coded region.

15. The method of claim 14, wherein the previous coded region corresponds to a left region, a top region or a temporally collocated region.

16. The method of claim 15, wherein a flag is used to indicate whether the parameters for the given global motion model are exactly predicted by said other parameters for the given global motion model associated with the previous coded region.

17. The method of claim 2, wherein a GMC indication is signalled in the video bitstream at a high level syntax to indicate whether the GMC mode is enabled for the region, wherein the high level syntax is higher than or equal to a level of the current processing unit.

18. The method of claim 17, wherein a GMC use flag is signalled in the video bitstream at the video encoder side or the GMC use flag is parsed from the video bitstream at the video decoder side, wherein the GMC use flag is within a level of the current processing unit in the video bitstream to indicate whether the GMC mode is applied to the current processing unit.

19. The method of claim 18, wherein when the GMC use flag indicates the GMC mode is applied to the current processing unit, a global motion index is used to identify said one global motion model selected from the multiple global motion models for the current processing unit.

20. The method of claim 18, wherein when the GMC use flag indicates the GMC mode is applied to the current processing unit, a global motion index delta is used to identify said one global motion model selected from the multiple global motion models for the current processing unit, wherein the global motion index delta corresponds to a difference between a first global motion index associated with the current processing unit and a second global motion index associated with a previous coded processing unit.

* * * * *